US 9,824,279 B2

(12) United States Patent
Henry

(10) Patent No.: US 9,824,279 B2
(45) Date of Patent: Nov. 21, 2017

(54) SYSTEMS AND METHODS FOR PROVIDING PLAYBACK OF SELECTED VIDEO SEGMENTS

(71) Applicant: Facebook, Inc., Menlo Park, CA (US)

(72) Inventor: Colleen Kelly Henry, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/971,983

(22) Filed: Dec. 16, 2015

(65) Prior Publication Data

US 2016/0283796 A1 Sep. 29, 2016

Related U.S. Application Data

(60) Provisional application No. 62/137,728, filed on Mar. 24, 2015.

(51) Int. Cl.
*G06K 9/00* (2006.01)
*G11B 27/034* (2006.01)
*G11B 27/10* (2006.01)

(52) U.S. Cl.
CPC ..... *G06K 9/00765* (2013.01); *G06K 9/00677* (2013.01); *G11B 27/034* (2013.01); *G11B 27/105* (2013.01)

(58) Field of Classification Search
CPC ............ G06K 9/00744; G06K 9/3241; G11B 27/105; G11B 27/034; H04N 21/23418; H04N 21/23424; H04N 21/23439
See application file for complete search history.

(56) References Cited

U.S. PATENT DOCUMENTS

| | | |
|---|---|---|
| 8,942,542 B1 | 1/2015 | Sherrets et al. |
| 2002/0120925 A1 | 8/2002 | Logan |
| 2007/0300258 A1 | 12/2007 | O'Connor et al. |
| 2008/0092168 A1 | 4/2008 | Logan et al. |
| 2011/0154405 A1 | 6/2011 | Isaias |
| 2012/0219271 A1 | 8/2012 | Vunic et al. |
| 2013/0111529 A1 | 5/2013 | Yao et al. |
| 2013/0332836 A1 | 12/2013 | Cho |
| 2014/0137144 A1 | 5/2014 | Jarvenpaa et al. |
| 2014/0325568 A1 | 10/2014 | Hoang et al. |

(Continued)

FOREIGN PATENT DOCUMENTS

| | | |
|---|---|---|
| EP | 2202647 | 6/2010 |
| KR | 20130138060 A | 12/2013 |
| KR | 101477486 B1 | 12/2014 |

OTHER PUBLICATIONS

European Patent Application No. 16162264.2, Search Report dated Jul. 26, 2016.

(Continued)

*Primary Examiner* — Huy T Nguyen
(74) *Attorney, Agent, or Firm* — Sheppard Mullin Richter & Hampton LLP

(57) ABSTRACT

Systems, methods, and non-transitory computer-readable media can identify a set of video segments that represents a video. A subset of video segments can be selected out of the set of video segments. A list that indicates a playback sequence for the subset of video segments can be generated. Playback of the subset of video segments can be provided based on the playback sequence indicated via the list.

20 Claims, 10 Drawing Sheets

(56) References Cited

U.S. PATENT DOCUMENTS

2014/0376887 A1\* 12/2014 Tijssen .................. G11B 27/34
386/282
2016/0172000 A1 6/2016 Ju et al.

OTHER PUBLICATIONS

International Application No. PCT/US2015/066506, International Search Report and Written Opinion dated Apr. 8, 2016.

\* cited by examiner

452

| LIST | | |
|---|---|---|
| 454 | 456 | 458 |
| I1 (S1) | 0 second mark | 1 second |
| I5 (S3) | 7 second mark | 1 second |
| I7 (S4) | 9 second mark | 1.5 seconds |
| I11 (S6) | 15 second mark | 1.5 seconds |

FIGURE 4B

SYSTEMS AND METHODS FOR PROVIDING PLAYBACK OF SELECTED VIDEO SEGMENTS

CROSS-REFERENCE TO RELATED APPLICATIONS

This application claims priority to U.S. Provisional Patent Application No. 62/137,728, filed on Mar. 24, 2015 and entitled "SYSTEMS AND METHODS FOR PROVIDING PLAYBACK OF SELECTED VIDEO SEGMENTS", which is incorporated herein by reference.

FIELD OF THE INVENTION

The present technology relates to the field of media processing. More particularly, the present technology relates to techniques for providing playback of selected video segments.

BACKGROUND

Today, people often utilize computing devices (or systems) for a wide variety of purposes. Users can use their computing devices to, for example, interact with one another, create content, share information, and access information. In some instances, a user of a computing device (or system) can utilize the computing device to generate or produce media content, such as videos or images. For example, the user can utilize a camera or image sensor of the computing device to record or capture videos. In another example, the user can utilize software running on the computing device to generate videos.

In some cases, media content such as videos can be uploaded or provided to a media content service (or system), which enables the videos to be accessed or viewed by one or more viewers or audiences. For instance, the user can utilize the computing device to upload a video to a social networking service (or system), which can provide certain social connections (or friends) of the user with access to the user's video. Under conventional approaches, videos from media content services are generally played back in full length and thus uninteresting, unenticing, or irrelevant content in the videos is often times presented. As such, in accordance with conventional approaches to video playback, viewers or audiences may lose interest in the videos due to what is being played back in the videos. Due to these and other reasons, conventional approaches can create challenges for or reduce the overall user experience associated with providing and accessing media content such as videos.

SUMMARY

Various embodiments of the present disclosure can include systems, methods, and non-transitory computer readable media configured to identify a set of video segments that represents a video. A subset of video segments can be selected out of the set of video segments. A list that indicates a playback sequence for the subset of video segments can be generated. Playback of the subset of video segments can be provided based on the playback sequence indicated via the list.

In an embodiment, selecting the subset of video segments out of the set of video segments can further comprise analyzing the set of video segments using one or more object recognition processes. Each video segment in the set can include a respective collection of still frames. One or more objects represented in a particular collection of still frames included in a particular video segment out of the set of video segments can be recognized. The particular video segment can be included in the subset of video segments.

In an embodiment, the one or more objects can include at least one of a face, a text, a character, a symbol, a logo, a mark, a landmark, a scene, or an action.

In an embodiment, the playback sequence can indicate at least one of a respective start time in the video for each video segment in the subset, a respective playback position in the video for each video segment in the subset, or a respective playback length for each video segment in the subset.

In an embodiment, selecting the subset of video segments can be based on information about an audience of the video.

In an embodiment, generating the list that indicates the playback sequence for the subset of video segments can be performed dynamically based on the information about the audience of the video.

In an embodiment, a second subset of video segments can be selected out of the set of video segments based on information about a second audience of the video. A second list that indicates a second playback sequence for the second subset of video segments can be generated. Playback of the second subset of video segments can be provided based on the second playback sequence indicated via the second list.

In an embodiment, selecting the subset of video segments can be based on at least one of metadata associated with the video, one or more subtitles associated with the video, or information provided by a third-party service.

In an embodiment, providing playback of the subset of video segments based on the playback sequence indicated via the list can be performed without creating a new video file and without performing a new video coding process.

In an embodiment, providing playback of the subset of video segments can be automatically performed when the subset of video segments is determined to be within a display area of a display element associated with a computing device of an audience of the video. Providing playback of the subset of video segments can transition to providing playback of the video when a particular user command is detected.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 4B illustrates an example list representation associated with providing playback of selected video segments, according to an embodiment of the present disclosure.

Figure 1:
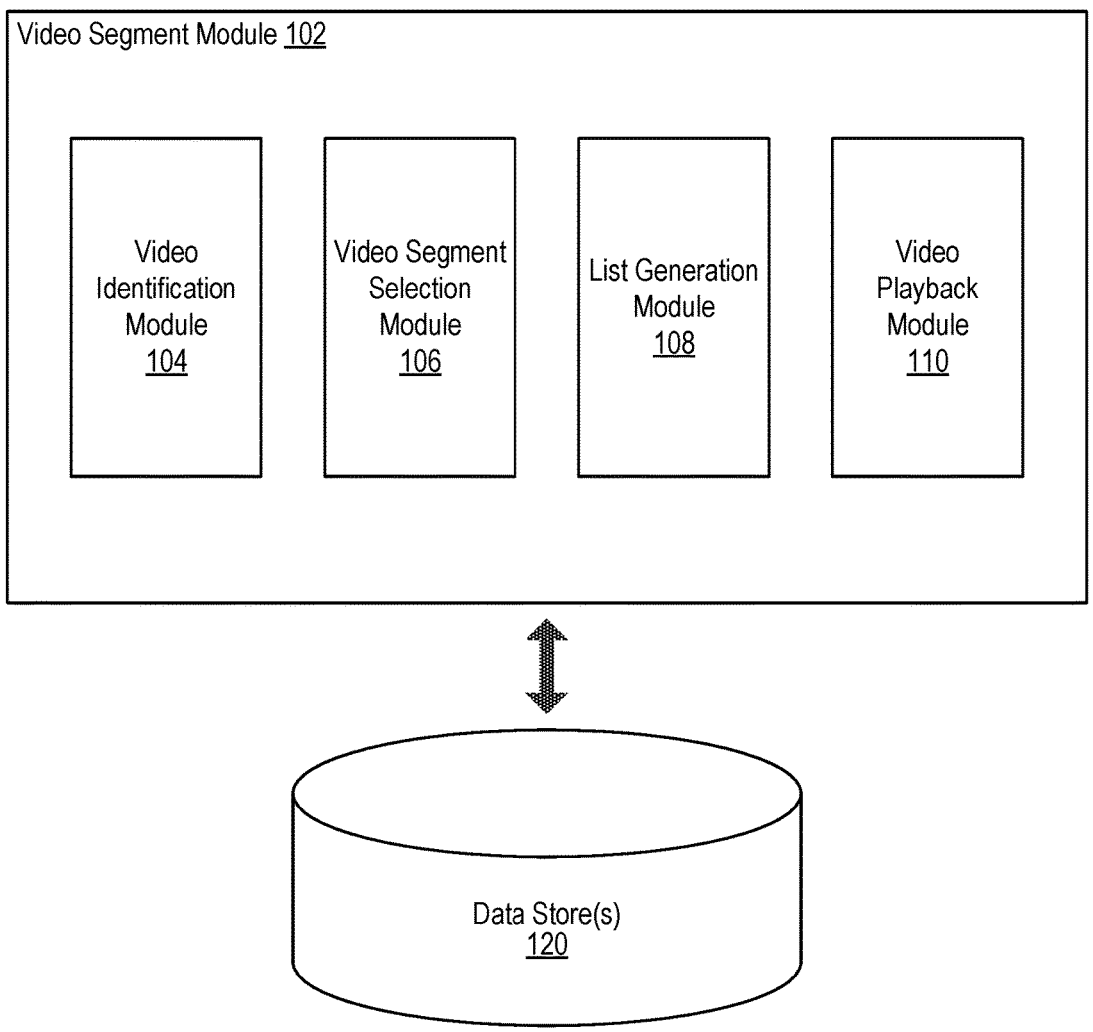
FIG. 1 illustrates an example system including an example video segment module configured to facilitate providing playback of selected video segments, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Playback of Selected Video Segments

People use computing devices (or systems) for a wide variety of purposes. Computing devices can provide different kinds of functionality. Users can utilize their computing devices to produce information, access information, and share information. In some cases, computing devices can include or correspond to cameras capable of capturing, recording, or acquiring media content, such as videos. In some instances, users can utilize computing devices to create, generate, or produce videos, such as via media software running on the computing devices.

In some cases, a user can use his or her computing device to acquire or provide a media content item, such as a video, to a media content service (or system). For instance, the user can upload or transmit the video to a social networking service (or system) that processes, manages, stores, and provides media content. In accordance with the user's privacy settings and/or other preferences, the social networking service can enable certain audiences, such as social connections or friends of the user within the social networking service, to view or access the user's video.

Under conventional approaches to providing video playback, media content services that store and provide videos generally present or play back the videos in their entireties. As such, viewers or audiences of the videos often times encounter boring, unappealing, or uninteresting portions of the videos. In one example, in accordance with conventional approaches, a media content component or functionality of the social networking service can present or play back a particular video in its full playback length. The beginning portions of the video may be boring or irrelevant to one or more audiences, while later portions are more interesting. However, in this example, due to the boring or irrelevant beginning portions, the one or more audiences may cease watching the video and thus miss the more interesting portions of the video.

As such, due to these and/or other concerns, conventional approaches can be inconvenient, inefficient, and/or impractical. Therefore, an improved approach can be beneficial for addressing or alleviating various drawbacks associated with conventional approaches. The disclosed technology can provide playback of selected video segments, such that the selected video segments are likely to be more interesting to viewers while also reducing the video playback length. Various embodiments of the present disclosure can identify a set of video segments that represents a video. A subset of video segments can be selected out of the set of video segments. A list that indicates a playback sequence for the subset of video segments can be generated. Playback of the subset of video segments can be provided based on (i.e., based at least in part on) the playback sequence indicated via the list. It is contemplated that there can be many variations and/or other possibilities.

FIG. 1 illustrates an example system 100 including an example video segment module 102 configured to facilitate providing playback of selected video segments, according to an embodiment of the present disclosure. As shown in the example of FIG. 1, the video segment module 102 can include a video identification module 104, a video segment selection module 106, a list generation module 108, and a video playback module 110. In some instances, the example system 100 can include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the video segment module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the video segment module 102 can be implemented, in part or in whole, as software running on one or more computing devices or systems, such as on a user or client computing device. For example, the video segment module 102 or at least a portion thereof can be implemented as or within an application (e.g., app), a program, or an applet, etc., running on a user computing device or a client computing system, such as the user device 710 of FIG. 7. In another example, the video segment module 102 or at least a portion thereof can be implemented using one or more computing devices or systems that include one or more servers, such as network servers or cloud servers. In some instances, the video segment module 102 can, in part or in whole, be implemented within or configured to operate in conjunction with a social networking system (or service), such as the social networking system 730 of FIG. 7. It should be understood that there can be many variations or other possibilities.

The video identification module 104 can be configured to facilitate identifying a set of video segments that represents a video (i.e., a video file, a video clip, etc.). In some embodiments, a video can have a set of intraframes or I-frames. The video can, for instance, have metadata or properties that provide information about each intraframe in the set of intraframes for the video. In general, an intraframe can correspond to a still frame (i.e., a video still frame, a video image frame, an image, etc.) that is referenced by other frames during coding of the video. In some cases, intraframes can periodically and/or repeatedly exist within the video. In some instances, a respective intraframe can be present at the beginning of each new scene in the video. In some cases, a coding process can determine where to place intraframes within the video. It is contemplated that many variations are possible.

Often times, videos can be made up of, can be formed by, and/or can include many video segments, video portions, or video chunks. Each intraframe can indicate or represent the beginning of a particular video segment or video portion in the video. As such, in some embodiments, the video identification module 104 can identify the set of video segments based on (i.e., based at least in part on) determining, receiving, or otherwise acquiring information about the set of intraframes.

In some implementations, the video identification module 104 can be configured to identify a video that is represented by the set of video segments. In one example, the video identification module 104 can identify a video that a user has requested to upload to or provide to a media content service, such as a media content component or functionality of the social networking system. In this example, the video includes or is associated with information that indicates that the video is represented by the set of videos. The video identification module 104 can access, have knowledge of, and/or recognize such information. Accordingly, in this example, the video identification module 104 can identify the set of video segments based on identifying the video. It should be understood that all examples herein are provided for illustrative purposes and that there can be many variations or other possibilities.

Moreover, the video segment selection module 106 can be configured to facilitate selecting a subset of video segments out of the set of video segments. For instance, the video segment selection module 106 can be configured to determine and select those video segments that are more likely to be interesting, enticing, appealing, and/or otherwise relevant to an audience. These video segments can be included in the subset of video segments selected by the video segment selection module 106. More details regarding the video segment selection module 106 will be provided below with reference to FIG. 2A.

In addition, the list generation module 108 can be configured to facilitate generating a list that indicates a playback sequence for the subset of video segments. For example, the list generation module 108 can generate or create a playlist or a manifest file that specifies which video segments are to be played back and in what order. In this example, the list (e.g., playlist, manifest file, etc.) can specify when each video segment in the subset is to be played back, presented, or provided. The list generation module 108 will be discussed in more detail with reference to FIG. 2B.

Furthermore, the video playback module 110 can be configured to facilitate providing playback of the subset of video segments based on the playback sequence indicated via the list. In some embodiments, providing playback of the subset of video segments based on the playback sequence indicated via the list can be performed without creating a new video file and without performing a new video coding process. For example, based on the playback sequence indicated in the list, the video playback module 110 can provide playback for each video segment in the subset in an order specified by the list. In this example, during playback, the video playback module 110 can cause the video segments in the subset to appear to be stitched or combined together based on the playback sequence. The creation of a new or additional video (i.e., an additional video file) using, including, or based on the subset of videos is not necessary since the list or the playback sequence already indicates how to access each video segment in the subset (e.g., where each video segment in the subset is located or positioned in the video) as well as the order or sequence in which the video segments in the subset are to be played back or presented.

Also, a new or repeated video coding process, such as another encoding or transcoding process subsequent to an initial coding process at upload time of the video, is not required for playback or presentation of the subset of video segments in accordance with the playback sequence. Therefore, the disclosed technology can provide playback of the subset of video segments without requiring significant resources such as time and computer processing power.

Moreover, in some embodiments, providing playback of the subset of video segments can be automatically performed, by the video playback module 110, when the subset of video segments is determined to be within a display area of a display element associated with a computing device of an audience of the video. Providing playback of the subset of video segments by the video playback module 110 can, in some cases, transition to providing playback of the video when a particular user command is detected. In one example, the audience can include a user of the social networking system. In this example, the user can scroll or browse through a feed, timeline, profile, or wall, etc., of the social networking system. The user can scroll or browse to a post or content item corresponding to the video, such that the post or content item is visible or viewable on the display element (e.g., display screen, touch display, etc.) of the user's computing device. As a result, the video playback module 110 can automatically provide playback or presentation of the subset of video segments, instead of playing back or presenting the video in its entirety. Continuing with this example, if he or she so desires, the user can click on, tap on, or otherwise interact with the post or content item corresponding to the video. The video playback module 110 can, in response, transition from providing playback of the subset of video segments to providing playback of the video when the user's click, tap, or other interaction with respect to the video is detected. In some instances, when the user command is detected, the video in its entirety can be played back from a playback position of the subset of video segments at the time of detecting the user command. In some cases, when the user command is detected, the video in its entirety can be played back from the beginning. In some instances, audio can be included (or excluded) during playback of the subset of video segments and/or the video. Many variations are possible.

Furthermore, in some implementations, the video segment module 102 can be configured to communicate and/or operate with the at least one data store 120, as shown in the example system 100. The at least one data store 120 can be configured to store and maintain various types of data. In some implementations, the at least one data store 120 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 120 can store information associated with users, such as user identifiers, user information, profile information, user locations, user specified settings, content produced or posted by users, and various other types of user data. In some embodiments, the at least one data store 120 can store information that is utilized by the video segment module 102. For instance, the at least one data store 120 can store information associated with videos and/or information associated with one or more audiences of the videos. It is contemplated that there can be many variations or other possibilities.

Figure 2A:
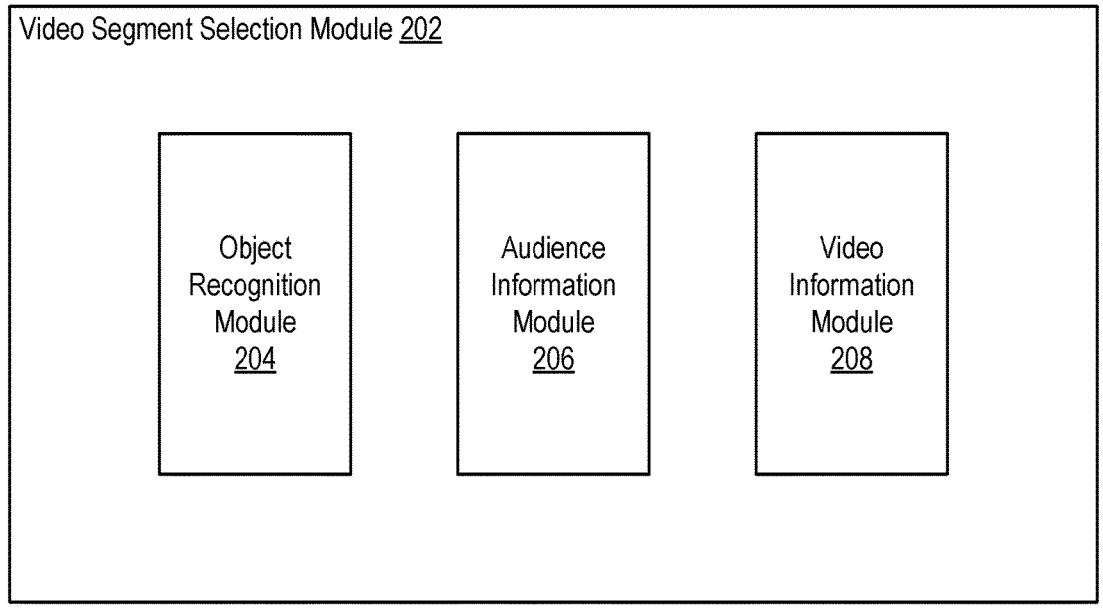
FIG. 2A illustrates an example video segment selection module configured to facilitate providing playback of selected video segments, according to an embodiment of the present disclosure.

FIG. 2A illustrates an example video segment selection module 202 configured to facilitate providing playback of selected video segments, according to an embodiment of the present disclosure. In some embodiments, the video segment selection module 106 of FIG. 1 can be implemented as the example video segment selection module 202. As shown in FIG. 2A, the video segment selection module 202 can include an object recognition module 204, an audience information module 206, and a video information module 208.

As discussed, the video segment selection module 202 can be configured to facilitate selecting a subset of video segments out of a set of video segments representing a video. For example, the video segment selection module 202 can attempt to determine and select video segments that have higher likelihoods to be interesting, enticing, appealing, and/or otherwise relevant, relative to a particular audience and/or in general. These video segments can be included in or can make up the subset of video segments. In some implementations, the video segment selection module 202 can select the subset of video segments out of the set of video segments based on utilizing the object recognition module 204 to analyze the set of video segments using one or more object recognition processes (e.g., machine vision). In some instances, each video segment in the set can include a respective collection of still frames (i.e., video still frames, video image frames, images, etc.). The object recognition module 204 can recognize one or more objects represented in a particular collection of still frames included in a particular video segment out of the set of video segments. The video segment selection module 202 can include or incorporate the particular video segment into the subset of video segments. This can be repeated to select other video segments for the subset.

In some implementations, the one or more objects can include at least one of a face, a text, a character, a symbol, a logo, a mark, a landmark, a scene, or an action, etc. In one example, the one or more object recognition processes can include one or more face recognition processes. As such, the object recognition module 204 can determine or recognize whether interesting entities, such as celebrities, are included in or depicted by the still frames for a given video segment. If the given video segments depicts (a face of) an entity that has at least a threshold likelihood of being interesting to a particular audience and/or in general, then the video segment selection module 202 can include the given video segment in the subset. In another example, the one or more object recognition processes can include one or more optical character recognition (OCR) processes. Accordingly, the object recognition module 204 can determine or recognize whether interesting text, characters, symbols, and/or marks, etc., are included in the still frames for a given video segment. If so, the video segment selection module 202 can include the given video segment in the subset. In a further example, the one or more object recognition processes can include one or more action/scene recognition processes (e.g., image/video classification processes). It follows that the object recognition module 204 can determine or recognize whether interesting actions or scenes are included in the still frames for a particular video segment. For a first audience (e.g., a first user, a first set of users), an action scene such as an explosion scene or a stunt scene can be interesting or relevant. If the particular video segment includes an action scene, then the video segment selection module 202 can include the particular video segment in the subset to be played back to the first audience. For a second audience, a romantic scene such as a kissing scene can be interesting or relevant. If another video segment includes a romantic scene, then the video segment selection module 202 can include the other video segment in the subset to be played back to the second audience. Again, it should be understood that the examples herein are provided for illustrative purposes and that many variations are possible.

Moreover, in some embodiments, the video segment selecting module 202 can select the subset of video segments based on information about an audience of the video. The video segment selecting module 202 can utilize the audience information module 206 to acquire information about a particular audience of the video, such as a user of the social networking system who is viewing or accessing the video. In some instances, if the user's privacy settings and/or preferences so allow, the audience information module 206 can acquire information about the user, such as his or her interests, likes, social engagements, and/or other social data. Based on this information, the video segments in the subset can be selected to increase or maximize the likelihood that the subset includes content that is interesting or relevant to the user.

Furthermore, in some embodiments, the video segment selecting module 202 can select the subset of video segments based on at least one of metadata associated with the video, one or more subtitles associated with the video, or information provided by a third-party service. The video information module 208 can be configured to acquire and/or process such video information (e.g., metadata, subtitles, third-party information, etc.). For example, the metadata for a given video can indicate that the given video depicts an interesting public figure at a particular video segment, such that the video segment selection module 202 can include the particular video segment in the subset. In another example, the subtitles can indicate that a given video segment is associated with a particular quote of interest, such that the video segment selection module 202 can include the given video segment in the subset. In a further example, third-party information can indicate that certain objects, entities, actions, topics, etc., are included in certain video segments. Such third-party information can also be utilized in selecting the subset of video segments. It should be appreciated that there can be many variations or other possibilities.

In some implementations, the video segment selection module 202 can also determine which video segments out of the set are less likely to be interesting, relevant, etc., and thus exclude such video segments from the subset of video segments. Again, many variations are possible.

Figure 2B:
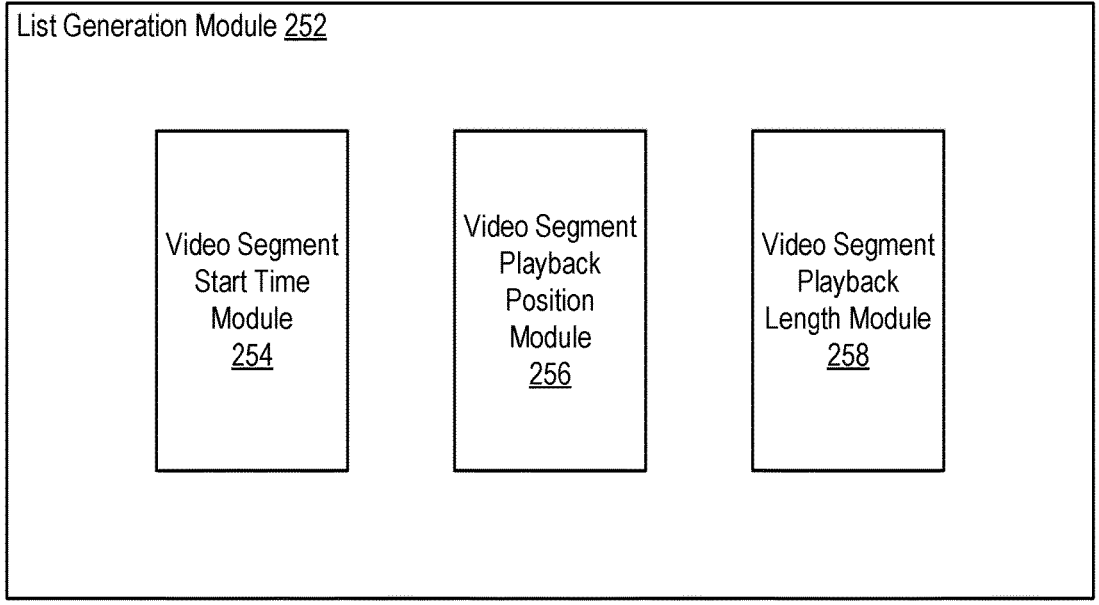
FIG. 2B illustrates an example list generation module configured to facilitate providing playback of selected video segments, according to an embodiment of the present disclosure.

FIG. 2B illustrates an example list generation module 252 configured to facilitate providing playback of selected video segments, according to an embodiment of the present disclosure. In some embodiments, the list generation module 108 of FIG. 1 can be implemented as the example list generation module 252. As shown in FIG. 2B, the list generation module 252 can include a video segment start time module 254, a video segment playback position module 256, and a video segment playback length module 258.

As discussed above, the list generation module 252 can be configured to facilitate generating a list that indicates a playback sequence for a subset of video segments. In some instances, the list can be associated with at least one of a playlist or a manifest file (i.e., manifest) that identifies video segments in the subset, specifies how to access and provide playback for each video segment in the subset, and/or indicates how long each video segment in the subset is to be played.

In some instances, the playback sequence can indicate at least one of a respective start time (e.g., timestamp, etc.) in the video for each video segment in the subset, a respective playback position (e.g., byte range, resource address, resource location, etc.) in the video for each video segment in the subset, or a respective playback length for each video segment in the subset. The video segment start time module 254 can be configured to determine, receive, or otherwise acquire the start time for each video segment in the subset. The video segment start time module 254 can also store and/or provide information about the start time for each video segment in the subset. Similarly, the video segment playback position module 256 can acquire the playback position for each video segment in the subset. The video segment playback position module 256 can also store and/or provide information about the playback position for each video segment in the subset. Moreover, the video segment playback length module 258 can acquire, store, and/or provide the playback length for each video segment in the subset. As such, in some embodiments, the list can be generated based on information provided by the video segment start time module 254, the video segment playback position module 256, and/or the video segment playback length module 258.

As discussed previously, in some implementations, the subset of video segments can be selected based on information about an audience of the video. The list generation module 252 can, in some cases, generate the list dynamically (or "on the fly") based on the information about the audience of the video. For instance, information about a particular viewer or a particular group of viewers can be acquired in (or near) real-time. The list generation module 252 can generate the list in (or near) real-time based on the information about the particular viewer or the particular group of viewers. In some cases, the subset of video segments can serve or appear as a trailer, a preview, or highlights for the video. When the subset of video segments is selected based on information about a particular audience, the subset of video segments can serve or appear as a trailer, a preview, or highlights of the video that has been tailored for the particular audience.

Furthermore, in one example, there can be a second audience of the video. A second subset of video segments can be selected out of the set of video segments based on (i.e., based at least in part on) information about the second audience of the video. In this example, the list generation module 252 can generate a second list that indicates a second playback sequence for the second subset of video segments. The disclosed technology can then provide playback of the second subset of video segments based on the second playback sequence indicated via the second list. Accordingly, the subset of video segments can be tailored or customized depending on the audience(s) of the video. It is contemplated that many variations are possible.

Figure 3:
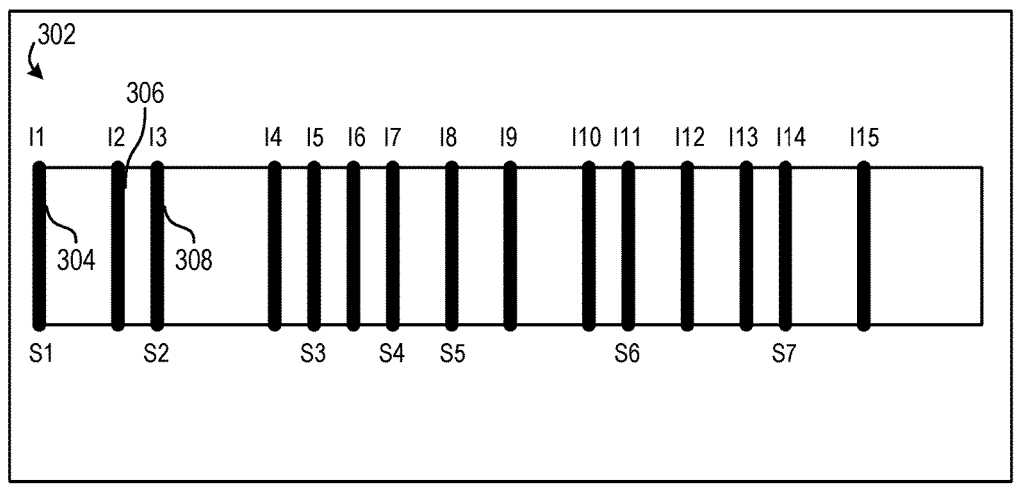
FIG. 3 illustrates an example video representation associated with providing playback of selected video segments, according to an embodiment of the present disclosure.

FIG. 3 illustrates an example video representation 300 associated with providing playback of selected video segments, according to an embodiment of the present disclosure. The example video representation 300 can, for instance, correspond to a video or a video file. The audio portion of the example video representation 300 is not explicitly illustrated in FIG. 3 so as to not obscure relevant details. As shown in FIG. 3, the example video representation 300 can include video data 302. The video data 302 can further include a set of video segments or video portions, each of which is based on a respective collection of still frames. The set of video segment can represent the video or form the example video representation 300.

As shown in the example of FIG. 3, each video segment in the set can be associated with a respective intraframe or I-frame. In some instances, intraframes can be inserted or placed at regular intervals of the video, where new scenes appear in the video, or wherever appropriate (e.g., as determined by a video coding process). In some cases, the beginning of each video segment in the set can be indicated by a particular intraframe. In this example, the first intraframe, I1 304, can indicate the beginning of the first video segment. The second intraframe, I2 306, can indicate the beginning of the second video segment (as well as the end of the first video segment), while the third intraframe, I3 308, can indicate the beginning of the third video segment (as well as the end of the second video segment), and so forth.

Furthermore, the video can include a plurality of scenes, such as Scene 1 (S1) through Scene 7 (S7). In this example, the beginning of a particular scene can be associated with a particular intraframe. As shown in this example, the first scene S1 can correspond to the first intraframe I1 304, the second scene S2 can correspond to the third intraframe I3 308, the third scene S3 can correspond to the fifth intraframe I5, and so forth. As discussed, various embodiments of the disclosed technology can select a subset of video segments out of the set of video segments and play back the selected subset of video segments, which can serve or appear as a preview, a trailer, or highlights for the video.

Figure 4A:
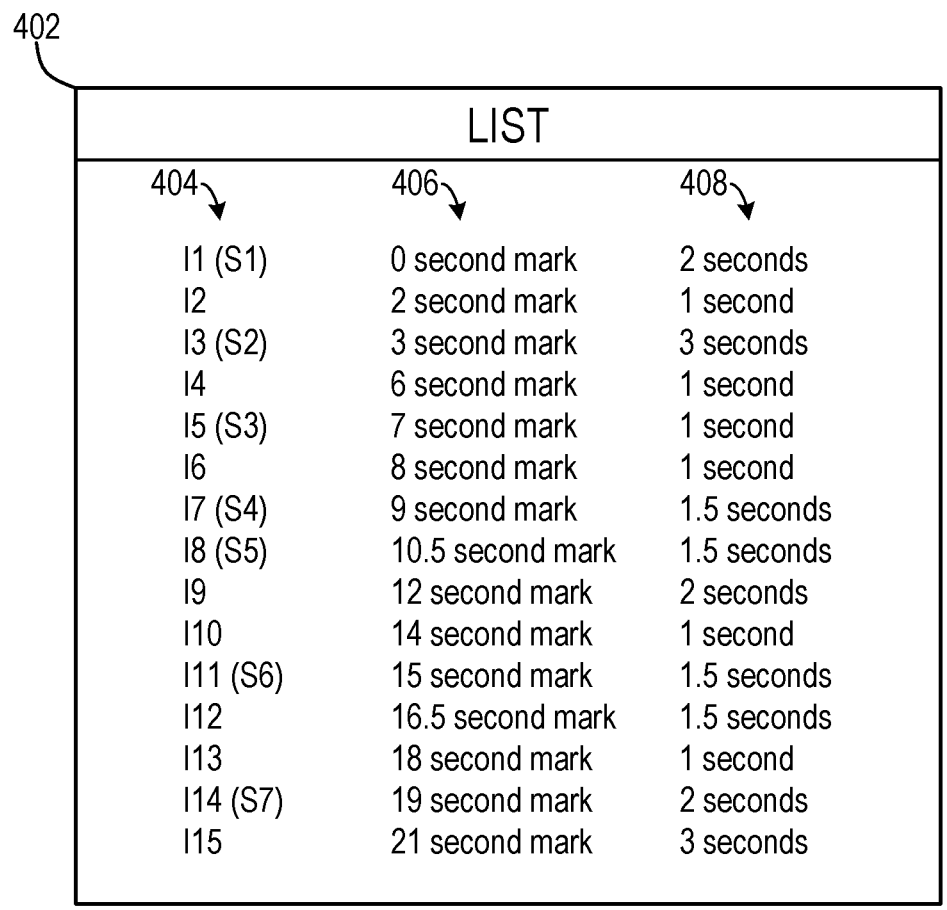
FIG. 4A illustrates an example list representation associated with providing playback of selected video segments, according to an embodiment of the present disclosure.

FIG. 4A illustrates an example list representation 402 associated with providing playback of selected video segments, according to an embodiment of the present disclosure. The example list representation 402 can correspond to a playlist or a manifest file for the example video representation 300 of FIG. 3. As shown in FIG. 4A, the example list representation 402 can identify video segments, such as based on intraframes 404. The example list representation 402 can also indicate a start time 406 (or a playback position) in the video for each video segment. Moreover, the example list representation 402 can also indicate a playback length 408 for each video segment. In this example, the example list representation 402 indicates a playback sequence in which a set of all video segments for a given video (e.g., the example video representation 300 of FIG. 3) is played back in an original or default order. Accordingly, when providing playback based on the example list representation 402, the entirety of the video is to be played back or presented.

FIG. 4B illustrates an example list representation 452 associated with providing playback of selected video segments, according to an embodiment of the present disclosure. The example list representation 452 can correspond to a playlist or a manifest file for the example video representation 300 of FIG. 3. As shown in FIG. 4B, the example list representation 452 can identify a subset of video segments out of a set of all video segments representing a given video (e.g., the example video representation 300 of FIG. 3). The subset of video segments can be selected based on how interesting, enticing, appealing, and/or relevant, etc., each video segment is.

In the example of FIG. 4B, it can be determined that a certain subset of video segments, including the first scene S1, the third scene S3, the fourth scene S4, and the sixth scene S6, have higher likelihoods of being interesting (and/ or enticing, appealing, relevant, etc.). For instance, objects that are likely to be interesting can have been recognized in these scenes. Accordingly, the example list representation 452 can include the video segments corresponding to these scenes (S1, S3, S4, and S6) into the subset to be played back or presented. As shown, the example list representation 452 can indicate a playback sequence that identifies these video segments (or scenes) based on their respective intraframes 454. The playback sequence can also indicate the start times (or playback positions) 456 in the given video for each video segment in the subset. Further, the playback sequence can indicate the playback length 458 for each video segment. In some embodiments, as shown in the example list representation 452, it is not required for each video segment to be played back for the duration of its full respective playback length. For example, a particular scene or video segment in the subset that likely has a higher interest or relevancy level can be played back for a longer duration, while another scene or video segment in the subset that likely has a lower interest or relevancy level can be played back for a shorter duration. It is contemplated that there can be many variations and other possibilities.

Figure 5:
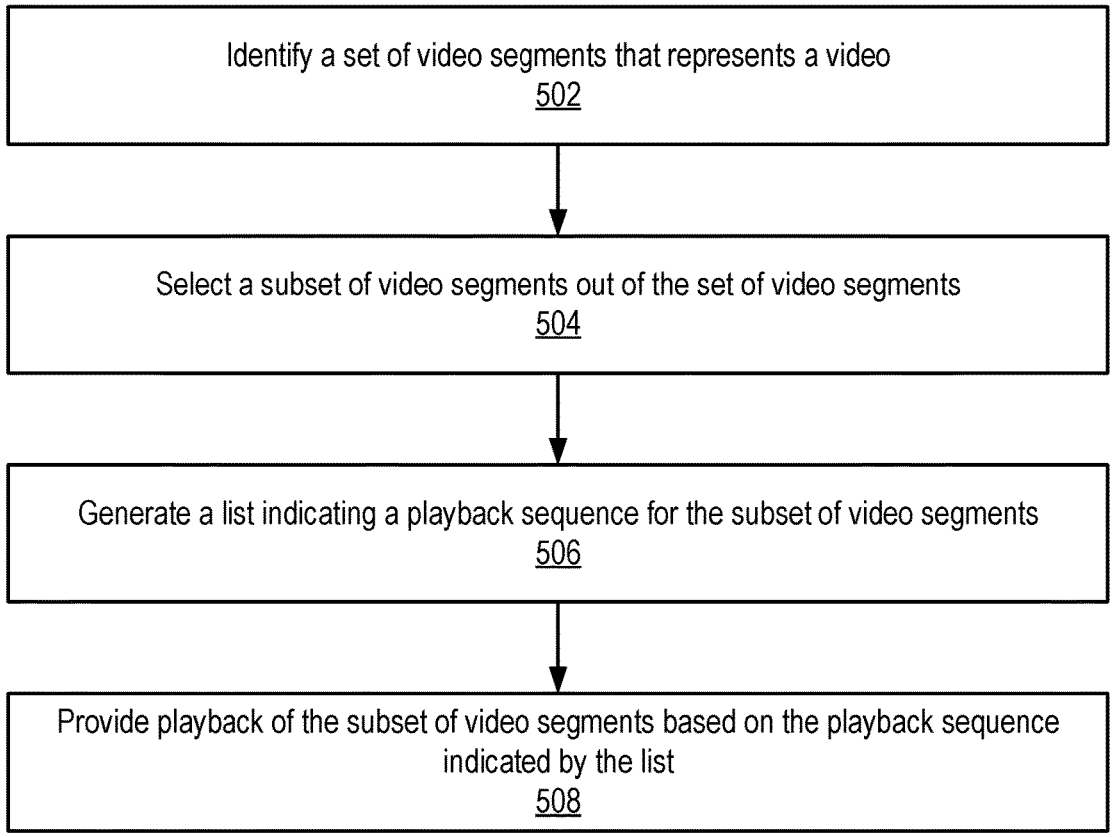
FIG. 5 illustrates an example method associated with providing playback of selected video segments, according to an embodiment of the present disclosure.

FIG. 5 illustrates an example method 500 associated with providing playback of selected video segments, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can identify a set of video segments that represents a video. At block 504, the example method 500 can select a subset of video segments out of the set of video segments. At block 506, the example method 500 can generate a list that indicates a playback sequence for the subset of video segments. At block 508, the example method 500 can provide playback of the subset of video segments based on the playback sequence indicated via the list.

Figure 6:
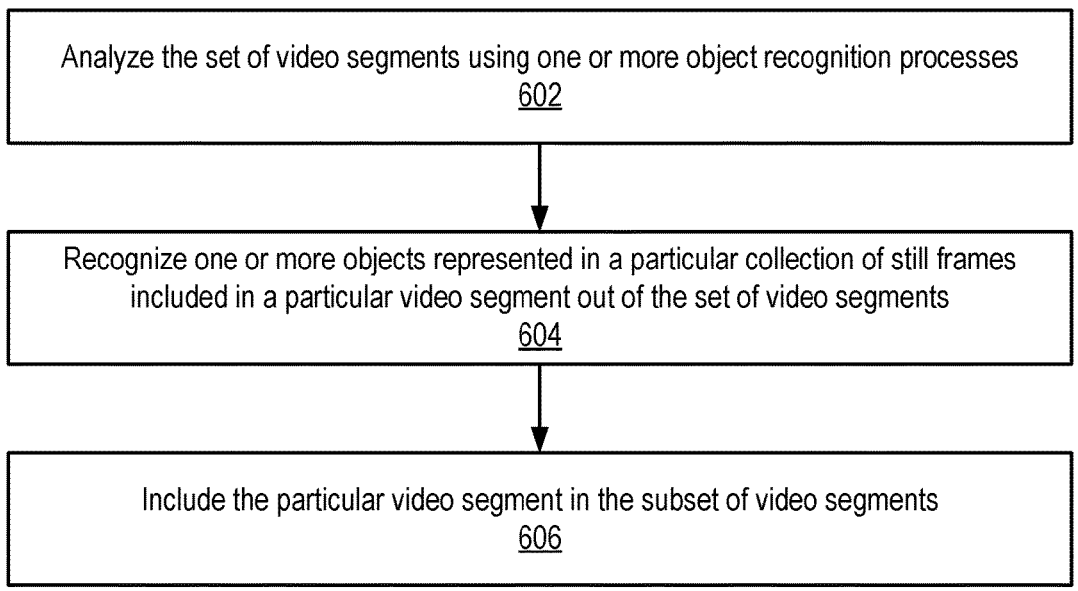
FIG. 6 illustrates an example method associated with providing playback of selected video segments, according to an embodiment of the present disclosure.

FIG. 6 illustrates an example method 600 associated with providing playback of selected video segments, according to an embodiment of the present disclosure. Again, it should be appreciated that there can be additional, fewer, or alternative steps performed in similar or alternative orders, or in parallel, within the scope of the various embodiments unless otherwise stated.

At block 602, the example method 600 can analyze the set of video segments using one or more object recognition processes. At block 604, the example method 600 can recognize one or more objects represented in a particular collection of still frames included in a particular video segment out of the set of video segments. At block 606, the example method 600 can include the particular video segment in the subset of video segments.

In some embodiments, a subset of video segments representing a given video can be selected randomly. In some embodiments, the subset of video segments can be selected at specified times or intervals within the given video. Moreover, in some implementations, multiple versions of the given video (and/or audio) can be generated, such as a standard definition/resolution version and a high definition/resolution version. Similarly, in some implementations, multiple versions of the subset of video segments for the given video can be provided as well.

It is contemplated that there can be many other uses, applications, features, possibilities, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
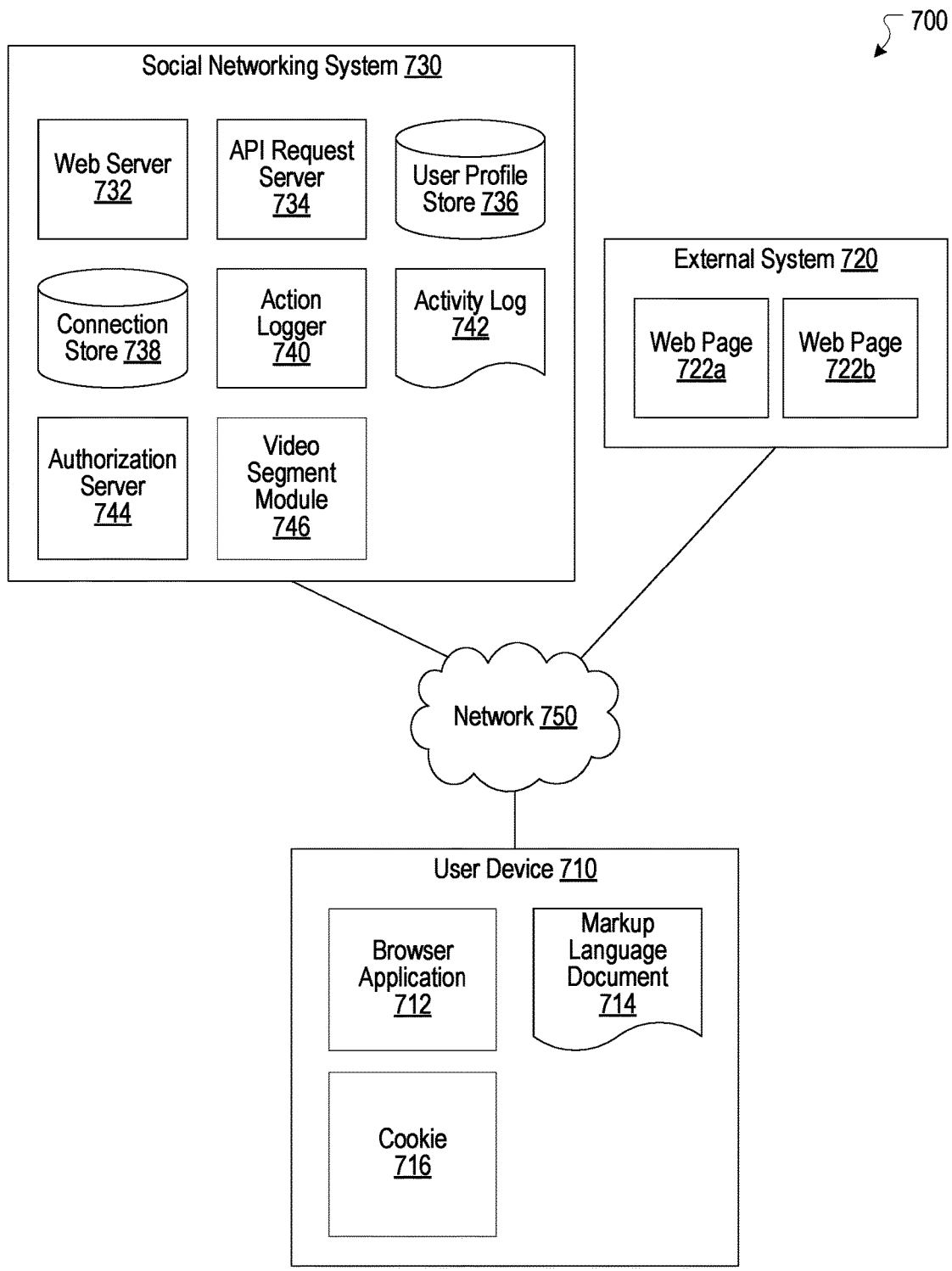
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a video segment module 746. The video segment module 746 can, for example, be implemented as the video segment module 102 of FIG. 1. As discussed previously, it should be appreciated that there can be many variations or other possibilities. For example, in some instances, the video segment module 746 (or at least a portion thereof) can be included in the user device 710. Other features of the video segment module 746 are discussed herein in connection with the video segment module 102.

Hardware Implementation

Figure 8:
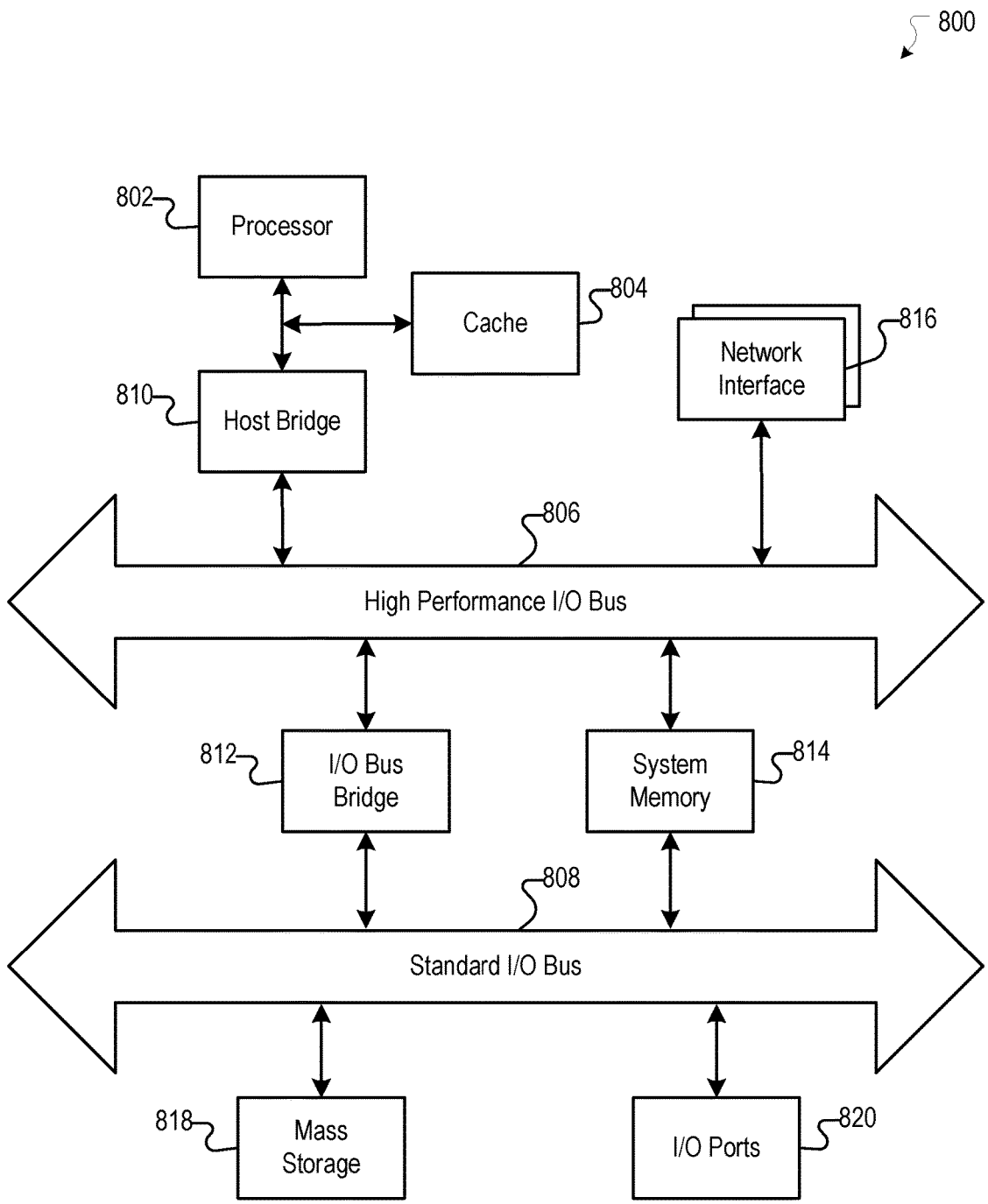
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to one embodiment", an embodiment", "other embodiments", one series of embodiments", some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    identifying, by a computing system, a set of video segments that represents a video;
    selecting, by the computing system, a subset of video segments out of the set of video segments based on an analysis of one or more objects represented in each video segment in the set of video segments;
    generating, by the computing system, a list that indicates a playback sequence for the subset of video segments; and
    providing, by the computing system, playback of the subset of video segments based on the playback sequence indicated via the list.

2. The computer-implemented method of claim 1, wherein the selecting the subset of video segments out of the set of video segments further comprises:
    analyzing the set of video segments using one or more object recognition processes, wherein each video segment in the set includes a respective collection of still frames;
    recognizing one or more objects represented in a particular collection of still frames included in a particular video segment out of the set of video segments; and
    including the particular video segment in the subset of video segments.

3. The computer-implemented method of claim 2, wherein the one or more objects represented in the particular collection of still frames include at least one of a face, a text, a character, a symbol, a logo, a mark, a landmark, a scene, or an action.

4. The computer-implemented method of claim 1, wherein the playback sequence indicates at least one of a respective start time in the video for each video segment in the subset, a respective playback position in the video for each video segment in the subset, or a respective playback length for each video segment in the subset.

5. The computer-implemented method of claim 1, wherein the selecting the subset of video segments is based on information about an audience of the video.

6. The computer-implemented method of claim 5, wherein the generating the list that indicates the playback sequence for the subset of video segments is performed dynamically based on the information about the audience of the video.

7. The computer-implemented method of claim 5, further comprising:
    selecting a second subset of video segments out of the set of video segments based on information about a second audience of the video;
    generating a second list that indicates a second playback sequence for the second subset of video segments; and
    providing playback of the second subset of video segments based on the second playback sequence indicated via the second list.

8. The computer-implemented method of claim 1, wherein the selecting the subset of video segments is based on at least one of metadata associated with the video, one or more subtitles associated with the video, or information provided by a third-party service.

9. The computer-implemented method of claim 1, wherein the providing playback of the subset of video segments based on the playback sequence indicated via the list is performed without creating a new video file and without performing a new video coding process.

10. The computer-implemented method of claim 1, wherein the providing playback of the subset of video segments is automatically performed when the subset of video segments is determined to be within a display area of a display element associated with a computing device of an audience of the video, and wherein providing playback of the subset of video segments transitions to providing playback of the video when a particular user command is detected.

11. A system comprising:
   at least one processor; and
   a memory storing instructions that, when executed by the at least one processor, cause the system to perform:
      identifying a set of video segments that represents a video;
      selecting a subset of video segments out of the set of video segments based on an analysis of one or more objects represented in each video segment in the set of video segments;
      generating a list that indicates a playback sequence for the subset of video segments; and
      providing playback of the subset of video segments based on the playback sequence indicated via the list.

12. The system of claim 11, wherein the selecting the subset of video segments out of the set of video segments further comprises:
   analyzing the set of video segments using one or more object recognition processes, wherein each video segment in the set includes a respective collection of still frames;
   recognizing one or more objects represented in a particular collection of still frames included in a particular video segment out of the set of video segments; and
   including the particular video segment in the subset of video segments.

13. The system of claim 11, wherein the playback sequence indicates at least one of a respective start time in the video for each video segment in the subset, a respective playback position in the video for each video segment in the subset, or a respective playback length for each video segment in the subset.

14. The system of claim 11, wherein the selecting the subset of video segments is based on information about an audience of the video.

15. The system of claim 11, wherein the providing playback of the subset of video segments based on the playback sequence indicated via the list is performed without creating a new video file and without performing a new video coding process.

16. A non-transitory computer-readable storage medium including instructions that, when executed by at least one processor of a computing system, cause the computing system to perform:
   identifying a set of video segments that represents a video;
   selecting a subset of video segments out of the set of video segments based on an analysis of one or more objects represented in each video segment in the set of video segments;
   generating a list that indicates a playback sequence for the subset of video segments; and
   providing playback of the subset of video segments based on the playback sequence indicated via the list.

17. The non-transitory computer-readable storage medium of claim 16, wherein the selecting the subset of video segments out of the set of video segments further comprises:
   analyzing the set of video segments using one or more object recognition processes, wherein each video segment in the set includes a respective collection of still frames;
   recognizing one or more objects represented in a particular collection of still frames included in a particular video segment out of the set of video segments; and
   including the particular video segment in the subset of video segments.

18. The non-transitory computer-readable storage medium of claim 16, wherein the playback sequence indicates at least one of a respective start time in the video for each video segment in the subset, a respective playback position in the video for each video segment in the subset, or a respective playback length for each video segment in the subset.

19. The non-transitory computer-readable storage medium of claim 16, wherein the selecting the subset of video segments is based on information about an audience of the video.

20. The non-transitory computer-readable storage medium of claim 16, wherein the providing playback of the subset of video segments based on the playback sequence indicated via the list is performed without creating a new video file and without performing a new video coding process.

* * * * *